United States Patent [19]
Auborn

[11] 3,926,669
[45] Dec. 16, 1975

[54] ELECTROCHEMICAL CELLS HAVING AN ELECTROLYTIC SOLUTION COMPRISING A COVALENT INORGANIC OXYHALIDE SOLVENT

[75] Inventor: James J. Auborn, Groton, Mass.

[73] Assignee: GTE Laboratories Incorporated, Waltham, Mass.

[22] Filed: Aug. 2, 1973

[21] Appl. No.: 385,127

Related U.S. Application Data

[63] Continuation-in-part of Ser. Nos. 305,811, Nov. 13, 1972, abandoned, and Ser. No. 305,812, Nov. 13, 1972, abandoned.

[52] U.S. Cl. ............ 136/6 LN; 136/83; 136/100 R; 136/137
[51] Int. Cl. ......................................... H01m 17/00
[58] Field of Search ........ 136/6 LN, 6 R, 20, 83 R, 136/100 R, 154–155, 137, 121, 6 F

[56] References Cited
UNITED STATES PATENTS
3,542,602  11/1970  Gabano............................... 136/155
3,567,515  3/1971  Maricle et al.......................... 136/6

OTHER PUBLICATIONS

Audrieth et al., Non–aqueous Solvents, Wiley and Sons, Inc. (1953), pp. 234–249.

*Primary Examiner*—Anthony Skapars
*Attorney, Agent, or Firm*—Irving M. Kriegsman

[57] ABSTRACT

Electrochemical cells having an oxidizable active anode material, a solid metallic cathode current collector, and an electrolytic solution between and in contact with the anode and the cathode current collector, the electrolytic solution comprising a liquid covalent inorganic oxyhalide or thiohalide solvent and a solute dissolved therein, the inorganic solvent being the sole oxidant material and sole solvent material in the cell.

The cathode comprises a solid, non-consumable, electrically conducting, inert current collector upon the surface of which the inorganic solvent is electrochemically reduced, whereby the inorganic solvent in conjunction with the oxidizable anode serves as a source of electrical energy during operation of the cell.

15 Claims, No Drawings

ELECTROCHEMICAL CELLS HAVING AN ELECTROLYTIC SOLUTION COMPRISING A COVALENT INORGANIC OXYHALIDE SOLVENT

REFERENCE TO PARENT APPLICATIONS

This application is a continuation-in-part application of applications Ser. Nos. 305,811 and 305,812, both filed Nov. 13, 1972, now abandoned.

BACKGROUND OF THE INVENTION

This invention relates to electrochemical cells. Most particularly, it relates to electrochemical cells having an oxidizable active anode material, a solid metallic cathode current collector, and a covalent inorganic oxyhalide or thiohalide as the solvent for the electrolytic solution.

Modern technology has placed increased emphasis on producing an electrochemical power source having improved reliability, light weight, small size, high power and long life. Power sources meeting these requirements find ready civilian and military applications in portable communications systems, entertainment products, emergency lights, and portable electronic devices, such as wristwatches and hearing aids. An inexpensive, lightweight, high power, reliable power source would be of great value for use, for example, with portable radios or television sets.

Various high-voltage, high-energy density electrochemical cells have been the subject of recent investigation. Much of the work in this area has been involved with electrochemical cells having negative electrodes comprising highly reactive metals such as lithium.

Work on electrolytes for lithium-based electrochemical power sources has progressed generally along two major lines: high temperature, inorganic molten salt electrolytes and organic solvent-based electrolytes. A cell which utilizes a molten salt electrolyte provides a chemically stable system in which strong oxidants such as chlorine can be used as cathodes. For example, a molten salt cell utilizing a lithium anode and chlorine cathode provides exceptionally high energy and power density making development of a practical cell with these materials of particular interest. The molten salt lithium/chlorine cell (having a lithium anode, chlorine cathode and molten salt, typically lithium chloride, electrolyte) has many characteristics desirable in a high performance electrochemical cell. The anode is highly electropositive, and the cathode is highly electronegative. The equivalent weight of the reaction product is low and the anode, cathode and electrolyte conductivities are high. Nevertheless, these cells have severe problems. The temperature range of operation, which for the lithium chloride electrolyte is 450° to 650°C, necessitates heating systems and insulation that increase cell cost, weight and complexity. To collect and store the chlorine evolved in rechargeable cells at these high temperatures, auxiliary systems are needed. In addition, there are few materials that can withstand, for extended periods of time, the attack of molten lithium, chlorine and molten lithium chloride at these temperatures; therefore, the operating lifetime of these cells is relatively short, typically 20 to 30 minutes. The measured and theoretical open circuit voltage of these high temperature cells is about 3.5 volts, although approximately 4 volts are theoretically obtainable at 25°C (at higher temperatures the potential is lower because of the energy charge in the overall cell reaction).

In parallel with the development of lithium cells with molten salt electrolytes, lithium cells with nonhydroxylic organic solvents have been developed. These cells have been called "organic electrolyte cells" although typically they employ electrolytes consisting of inorganic salts in organic solvents. Cells of this type have the advantage of being operable at room temperature; however, chlorine itself and other strong oxidants cannot be used as the cathode depolarizer with these solvents since the solvents are oxidized by chlorine. Therefore, cells of this type will not provide an energy density as high as a lithium/chlorine cell.

In application Ser. No. 342,233, filed Mar. 16, 1973, a continuation-in-part application of application Ser. No. 131,530 filed Apr. 5, 1971, now abandoned, there is described an electrochemical cell having an active anode material selected from a specific group of materials, including lithium, a halogen or metal halide active cathode material, and an electrolyte containing phosphorus oxychloride as the solvent material and a solute, selected from a wide range of materials, dissolved in the phosphorus oxychloride. The present invention is related to the invention described in the aforementioned application in that the same anodic, solvent and solute materials can be utilized in the present invention; however, this invention relates to the use of such materials with different cathode materials which cause, in conjunction with the oxidizable anode materials, the solvent material to be electrochemically reduced during operation of the cell.

SUMMARY OF THE INVENTION

This invention is directed to electrochemical cells having an oxidizable active anode material, a solid metallic cathode current collector, and an electrolytic solution between and in contact with the anode and the cathode current collector, the electrolytic solution comprising a liquid covalent inorganic oxyhalide or thiohalide solvent and a solute dissolved therein, the inorganic solvent being the sole oxidant material and sole solvent material in the cell.

The cathode comprises a solid, non-consumable, electrically conducting, inert current collector upon the surface of which the inorganic oxyhalide or thiohalide solvent is electrochemically reduced, whereby the inorganic solvent, in conjunction with the oxidizable anode, serves as a source of electrical energy during operation of the cell. Applicable cathode materials include the alkaline earth metals, such as beryllium, magnesium, calcium, strontium and barium; the Group IIIA metals, such as aluminum, gallium, indium, and thallium; the Group IV A metals, such as tin and lead; the Group V A metals, such as antimony and bismuth; the transistion metals, such as scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold and mercury; and rare earth metals, such as lanthanum, cerium, praseodymium, neodymium, samarium, europium, gadolinium, terbium, dysprosium, holmium, erbium, thulium, ytterbium, and lutetium, and combinations thereof. It is believed that the inorganic oxyhalide or thiohalide solvent is electrochemically reduced on the surface of the cathode current collector to yield a halogen ion which reacts with a metallic ion from the anode to form a soluble metal halide, such as, for example, lithium chloride. The overall effect is to electrochemically reduce the solvent by removal of a portion of its halogen content in conjunction with the oxidation of the anode metal and thereby obtain electrical energy therefrom. This energy can be attained, however, in the absence of other cathode depolarizers or oxidant materials, such as sulfur dioxide, which are not needed in the cells of this invention since the inorganic oxyhalide or thiohalide solvent also serves as the oxidant material. In addition, it is believed that the inorganic oxyhalide or thiohalide solvent passivates the anode material, whereby the need to provide an additive or a further material to passivate the anode is obviated.

The anode is an oxidizable material and is preferably lithium metal. Other oxidizable anode materials contemplated for use in the cells of this invention include the other alkali metals, such as sodium, potassium, etc., and the metallic cathode materials referred to above, provided the anode material selected provides a potential vs. the inert cathode current collector selected in the covalent inorganic thiohalide or oxyhalide-based electrolytic solution (i.e., the anode is more electropositive than the inert cathode current collector utilized) and the anode can be oxidized thereby. The anode may be constructed of the oxidizable material in contact with a metal grid. The grid for a lithium anode, for example, may be made of nickel, nickel alloys (such as monel), stainless steel, silver, or platinum.

As used throughout this specification and claims, when an electrochemical cell is designated to have a particular anode or cathode, or to have a particular anode or cathode material, that anode or cathode, or anode or cathode material, shall mean the electrochemically active component of the anode structure, or the non-consumable, electrically conducting, inert metallic cathode current collector, as the case may be. Such an electrode may be in contact with, or form a part of, a suitable substrate which further defines the total anode or cathode structure.

As indicated above, the electrolytic solution comprises a stable liquid covalent inorganic oxyhalide or thiohalide solvent and a solute dissolved therein. Applicable solvent materials include phosphorus oxychloride, monofluorophosphoryl dichloride, monobromophsophoryl dichloride, phosphorus oxybromide, thiophosphoryl chloride, thiophosphoryl bromide, thionyl chloride, thionyl bromide, sulfuryl chloride, selenium oxychloride, and compatible mixtures thereof.

It is preferred that the solvent be dried prior to use. In the case of phosphorus oxychloride, this is accomplished by boiling this solvent material with clean lithium shot for twelve hours at room temperature under an argon atmosphere. The solvent is then distilled at atmospheric pressure and the material which boils between 105° and 106°C collected. The solvent thus prepared has a specific conductance of less than $7 \times 10^{-7}$ Mhos/cm. Other solvents can be dried in an analogous manner (with solvent collection being at or about the boiling point of the particular material), or by techniques known in the art. Since these solvents are electrochemically reducible, but otherwise relatively non-reactive, and the reaction products of such reduction are relatively non-reactive, cells can be constructed with a wide range of anode and cathode materials, particularly anode materials which themselves are highly reactive, such as, for example, lithium.

The typical solute provides at least one anion of the general formula $X^-$, $MX_4^-$, $M'X_6^-$, and $M''Cl_6^{--}$, where M is an element selected from the group consisting of aluminum and boron; M' is an element selected from the group consisting of phosphorus, arsenic, and antimony; M'' is an element selected from the group consisting of tin, zirconium and titanium; and X is a halogen. Examples of suitable solutes yielding anions $MX_4^-$ are: tetrachloroaluminates ($AlCl_4^-$), tetrabromoaluminates ($AlBr_4^-$), tetrachloroborates ($BCl_4^-$), and tetrafluoroborates ($BF_4^-$). Examples of solutes yielding anions $M'X_6^-$ are: hexafluorophosphates ($PF_6^-$), hexafluoroarsentates ($AsF_6^-$), hexafluoroantimonates ($SbF_6^-$) and hexachloroantimonates ($SbCl_6^-$). Examples of solutes yielding anions $M''Cl_6^{--}$ are: hexachlorostannates ($SnCl_6^{--}$), hexachlorozirconates ($ZrCl_6^{--}$) and hexachlorotitanates ($TiCl_6^{--}$). Solutes yielding a halogen anion, particularly chlorides ($Cl^-$), bromides ($Br^-$), and iodides ($I^-$), and solutes providing one of the anions dichloroiodates ($ICl_2^-$), dichlorophsophates ($PO_2Cl_2^-$), perchlorates ($ClO_4^-$) and chlorosulfates ($SO_3Cl^-$) are also contemplated within the scope of this invention.

The solute also provides at least one cation. This cation may be of an alkali metal, such as lithium, sodium, potassium, cesium, and rubidium; an alkaline earth metal, such as magnesium, calcium, strontium, and barium; or a lanthanide rare earth element, such as lanthanum, terbium, neodymium, cerium, europium and samarium. Cations having the following general formula $R_4N^+$ where R is a radical selected from the group consisting of methyl, ethyl, propyl, isopropyl, butyl and isobutyl are also contemplated to be suitable for use in this invention. Examples of suitable cations are: tetramethylammonium $(CH_3)_4^+$, tetraethylammonium $(C_2H_5)_4N^+$, tetrapropylammonium $(C_3H_7)_4N^+$, and tetrabutylammonium $(C_4H_9)_4N^+$. These cations may be added as the tetraalkylammonium chloride, for example. Other cations contemplated within the scope of this invention are those resulting from solvent dissociation such as phosphorus oxydichloride ($POCl_2^+$) in the case of a phosphorus oxychloride-based electrolytic solution, $SOCl^+$, and $SO_2Cl^+$, etc.

The solute for a particular cell can be chosen to yield a combination of any of the anions and cations listed above; however, the electrolyte must contain at least $10^{-3}$ moles per liter of cation and at least $10^{-3}$ moles per liter of anion. Preferably, at least $10^{-1}$ moles per liter of cation and at least $10^{-1}$ moles per liter of anion are present. It is also preferred that a dried solute be used or that the electrolytic solution be dried after it is prepared.

Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate and lithium chlorosulfate. Other preferred compounds are Lewis acids, particularly aluminum chloride ($AlCl_3$), boron trichloride ($BCl_3$), boron fluoride ($BF_3$), tin chloride ($SnCl_4$), antimony chloride ($SbCl_5$), antimony fluoride ($SbF_5$), titanium chloride ($TiCl_4$), aluminum bromide ($AlBr_3$), phosphorus fluoride ($PF_5$), phosphorus chloride ($PCl_5$), arsenic fluoride ($AsF_5$), arsenic chloride ($AsCl_5$), zinc chloride ($ZnCl_2$) and zirconium chloride ($ZrCl_4$), in conjunction with a metal halide such as lithium chloride. In addition, Lewis bases having the general formula $A_mB_n$ where A is an element selected from the group consisting of lithium, sodium, potassium, rubidium, cesium, magnesium, calcium, strontium, barium and the rare earths and B is an element selected from fluorine, chlorine, bromine, iodine and oxygen are also useful. Included in this latter category are cesium chloride, rubidium chloride, and barium chloride.

The required anion and cation may be formed as a result of a chemical reaction directly with the solvent. For example, the Lewis acid $AlCl_3$ will react with the solvent $POCl_3$ to yield the anion $AlCl_4^-$. The anion and cation may also be formed as a result of the reaction of a Lewis acid with a Lewis base dissolved in the solvent. For example, lithium chloride, LiCl, a Lewis base, will react with $AlCl_3$ to form $LiAlCl_4$ which dissociates in part to solvated $Li^+$ and $AlCl_4^-$.

Although not required for all of the cells of this invention, a suitable separator can be employed to prevent the reaction of anode and cathode materials when no electrical current flows through the external circuit. A separator prevents the diffusion of cathode material to the anode. When the cathode material is soluble in the electrolyte, an ion selective separator which allows only a particular ion or group of ions to migrate between the anode and cathode may be used. Two major groups of ion selective separators are organic permselective membranes and inorganic zeolites. A particularly useful membrane which permits the flow of lithium ions is perfluorinated hydrocarbon (membrane) sulphonate. If the cathode material is not soluble in the electrolyte, or does not react spontaneously with the anode material, mechanical separators can be used. A wide variety of ceramic and plastic materials having small pore sizes are available. Examples of such materials include: alumina, beryllia, titania, porcelain, porous glass, fritted glass, glass mat, nonwoven porous polytetrafluoroethylene and other fluorinated polymers, polypropylene and polyethylene.

As indicated above, the electrochemical cells of this invention exclude sulfur dioxide and other oxidants as cathode depolarizer materials or as solvent or cosolvent materials. Thus, the present invention describes cells in which the oxyhalide or thiohalide solvent is electrochemically reduced in the absence of other oxidants, such as sulfur dioxide; thus distinguishing this invention from the cells of Maricle et al., U.S. Pat. Nos. 3,567,515 and 3,578,500, all of which make use of sulfur dioxide as an oxidant material. Further this invention describes the stability of lithium and the inorganic oxyhalide or thiohalide solvent, such as phosphorus oxychloride, in the absence of the passivating film of the lithium caused by the sulfur dioxide of Maricle et al, supra. It is now believed that the oxyhalide or thiohalide solvent passivates the anode material, whereby the need to provide a further material, such as the sulfur dioxide of Maricle et al, supra, to perform such a function is eliminated.

The present invention is also considered distinct from the cells described in French Pat. Nos. 1,000,044; 1,583,804; and 2,079,744. The cells described therein make use of dissolved or in situ generated oxidants as the active cathode material (called the anode or positive electrode in the French patents). Thus, the present invention is distinguished from the teachings of these patents because the solvent material hereof is utilized as the sole oxidant material in the cell, and there are no other oxidants (such as the bromine used in the battery described on pages 3 and 4 of French Pat. No. 2,079,744) present in these cells.

DESCRIPTION OF SPECIFIC EMBODIMENTS

The following Examples are given to enable those skilled in the art to more clearly understand and practice the present invention. They should not be considered as a limitation of the scope of the invention but merely as being illustrative and representative thereof.

EXAMPLES I-XVIII

In the following Examples, the cells have a lithium anode, and an electrolytic solution comprising a saturated solution of lithium tetrachloroaluminate in phosphorus oxychloride. The cathode components of each cell, the open circuit potential at 25°C, and the current density at 50% polarization at 25°C obtainable therewith are given in Table I below.

TABLE I

| EXAMPLE | CATHODE | OPEN CIRCUIT POTENTIAL, VOLTS | CURRENT DENSITY AT 50% POLARIZATION mA/cm$^2$) |
|---|---|---|---|
| I | Nickel | 2.80 | 0.200 |
| II | Gold | 2.92 | 0.357 |
| III | Tungsten | 2.50 | 0.190 |
| IV | Lead | 2.05 | 0.170 |
| V | Palladium | 2.70 | 0.155 |
| VI | Molybdenum | 2.75 | 0.105 |
| VII | Germanium | 2.75 | 0.300 |
| VIII | Silicon | 2.25 | 0.022 |
| IX | Cobalt | 2.75 | 0.250 |
| X | Silver | 2.70 | 0.155 |
| XI | Mercury | 2.90 | 0.155 |
| XII | Iron | 2.70 | 0.185 |
| XIII | 304 Stainless Steel | 2.80 | 0.170 |
| XIV | Niobium | 2.60 | 0.125 |
| XV | Manganese | 2.70 | 0.270 |
| XVI | Tantalum | 2.30 | 0.130 |
| XVII | Titanium | 2.50 | 0.053 |
| XVIII | Platinum | 2.90 | 0.130 |

EXAMPLES XIX-XXXIII

In the following Examples, the cells have a lithium anode, and an electrolytic solution comprising a 1.8 M solution of lithium tetrachloroaluminate in thionyl chloride. The cathode component of each cell, the open circuit potential at 25°C, and the current density at 50% polarization at 25°C obtainable therewith are given in Table II below.

TABLE II

| EXAMPLE | CATHODE | OPEN CIRCUIT POTENTIAL, VOLTS | CURRENT DENSITY AT 50% POLARIZATION (mA/cm$^2$) |
|---|---|---|---|
| XIX | Nickel | 3.66 | 1.142 |
| XX | Gold | 3.72 | >8.000 |
| XXI | Tungsten | 3.67 | 1.067 |
| XXII | Palladium | 3.74 | 1.225 |
| XXIII | Molybdenum | 3.69 | 1.573 |
| XXIV | Germanium | 3.44 | 0.939 |
| XXV | Silicon | 2.92 | 0.215 |
| XXVI | Cobalt | 3.56 | 0.644 |
| XXVII | Silver | 2.91 | 1.835 |
| XXVIII | 304 Stainless Steel | 3.56 | 0.221 |
| XXIX | Niobium | 3.53 | 0.370 |
| XXX | Manganese | 3.58 | 2.082 |
| XXXI | Tantalum | 3.44 | 0.497 |
| XXXII | Titanium | 3.06 | 1.201 |
| XXXIII | Platinum | 3.66 | 1.017 |

EXAMPLES XXXIV–XXXIX

In the following examples, the cells have a lithium anode and an electrolytic solution comprising a solution of lithium tetrachloroaluminate in the stated solvent. The cathode and solvent material for each exemplary cell are given in Table III below.

TABLE III

| EXAMPLE | CATHODE | SOLVENT |
| --- | --- | --- |
| XXXIV | Nickel | Thionyl bromide |
| XXXV | Gold | Monobromophosphoryl dichloride |
| XXXVI | Platinum | Phosphorus oxybromide<br>Phosphorus oxychloride (1:1) |
| XXXVII | Platinum | Thiophosphoryl bromide<br>Thiophosphoryl chloride (1:1) |
| XXXVIII | Nickel | Selenium oxychloride |
| XXXIX | Gold | Thionyl bromide<br>Thionyl chloride (1:1) |

While the present invention has been described with reference to specific embodiments thereof, it will be understood by those skilled in this art that various changes may be made without departing from the true spirit and scope of the invention. In addition, many modifications may be made to adapt the particular situation, material, need, apparatus, process, or then-present objectives, to the spirit of the present invention without departing from its essential teachings.

What is claimed is:

1. An electrochemical cell consisting essentially of an oxidizable active anode material; a solid, non-consumable, electrically conducting, inert cathode current collector selected from the group consisting of the alkaline earth metals, the Group III A metals, the Group IV A metals, the Group V A metals, the transition metals, the rare earth metals, and semiconductors; said anode material being more electropositive than said cathode current collector and thus said anode material is oxidized during operation of said cell; and an electrolytic solution between and in contact with said anode and said cathode current collector, said electrolytic solution consisting essentially of a liquid, electrochemically reducible, covalent inorganic oxyhalide or thiohalide solvent and a solute dissolved therein, said inorganic solvent being the sole oxidant material and sole solvent material in said electrolytic solution; said inorganic solvent being electrochemically reduced upon the surface of said cathode current collector, whereby said inorganic solvent in conjunction with said oxidizable anode material serves as a source of electrical energy during operation of said cell.

2. The electrochemical cell of claim 1 wherein said active anode material is lithium.

3. The electrochemical cell of claim 1 wherein said active anode material is sodium.

4. The electrochemical cell of claim 1 wherein said inorganic solvent includes at least one oxyhalide of phosphorus, sulfur or selenium.

5. The electrochemical cell of claim 1 wherein said inorganic solvent is selected from the group consisting of phosphorus oxychloride, monofluorophosphoryl dichloride, monobromophosphoryl dichloride, phosphorus oxybromide, thiophosphoryl chloride, thiophosphoryl bromide, thionyl chloride, thionyl bromide, sulfuryl chloride, selenium oxychloride, and mixtures thereof.

6. The electrochemical cell of claim 1 wherein said inorganic solvent is thionyl chloride or sulfuryl chloride.

7. The electrochemical cell of claim 1 wherein said inorganic solvent is phorphorus oxychloride.

8. The electrochemical cell of claim 1 wherein said solute provides at least one anion having the formula $X^-$, $MX_4^-$, $M'X_6^-$, and $M''X_6^{--}$, where M is an element selected from the group consisting of aluminum and boron; M' is an element selected from the group consisting of phosphorus, arsenic and antimony; M'' is an element selected from the group consisting of tin, zirconium and titanium; and X is a halogen; said solute further providing at least one cation selected from the group consisting of alkali metals, the alkaline earth metals, the lanthanides, $POCl_2^+$, $SOCl^+$, $SO_2Cl^+$, and $R_4N^+$, where R is a radical selected from the group consisting of methyl, ethyl, propyl, isopropyl, butyl and isobutyl.

9. The electrochemical cell of claim 1 wherein said solute includes at least one compound selected from the group consisting of lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate and lithium chlorosulfate.

10. The electrochemical cell of claim 1 wherein said solute includes a Lewis acid.

11. The electrochemical cell of claim 10 wherein said solute further includes a Lewis base having the general formula $A_mB_n$ where A is an element selected from the group consisting of lithium, sodium, potassium, rubidium, cesium, magnesium, calcium, strontium, barium, and the rare earth elements; B is an element selected from the group consisting of fluorine, chlorine, bromine, iodine and oxygen; and m and n are integers.

12. The electrochemical cell of claim 1 wherein said solvent includes at least one thiohalide of phosphorus.

13. An electrochemical cell consisting essentially of an oxidizable active anode material; a solid, non-consumable, electrically conducting, inert cathode current collector; said anode material being more electrpositive than said cathode current collector and thus said anode material is oxidized during operation of said cell; and an electrolytic solution between and in contact with said anode material and said cathode current collector, said electrolytic solution consisting essentially of a liquid, electrochemically reducible covalent inorganic oxyhalide or thiohalide solvent and a solute dissolved therein; said inorganic solvent being selected from the group consisting of thionyl bromide, monobromophosphoryl dichloride, phosphorus oxybromide, monobromophosphoryl dichloride, phosphorus oxybromide, thiophosphoryl bromide, selenium oxychloride, mixtures thereof, and mixtures thereof with phosphorus oxychloride, monofluorophosphoryl dichloride, thionyl chloride, sulfuryl chloride, or thiophosphoryl chloride; said inorganic solvent being the sole oxidant material and sole solvent material in said electrolytic solution; said inorganic solvent being electrochemically reduced upon the surface of said cathode current collector, whereby said inorganic solvent in conjunction with said oxidizable anode material serves as a source of electrical energy during operation of said cell.

14. The electrochemical cell of claim 13 wherein said anode material is lithium.

15. An electrochemical cell consisting essentially of an oxidizable active anode material; a solid, non-consumable electrically conducting, inert cathode current collector; said anode material being more electropositive than said cathode current collector and thus said anode material is oxidized during operation of said cell; and an electrolytic solution between and in contact with said anode material and said cathode current collector, said electrolytic solution consisting essentially of a liquid, electrochemically reducible covalent inorganic oxyhalide or thiohalide solvent and a solute dissolved therein; said inorganic solvent comprising phosphorus oxychloride and a cosolvent material selected from the group consisting of thionyl bromide, monobromophosphoryl dichloride, phosphorus oxybromide, thiophosphoryl bromide, selenium oxychloride, monofluorophosphoryl dichloride, thionyl chloride, sulfuryl chloride, or thiophosphoryl chloride; said inorganic solvent being the sole oxidant material and sole solvent material in said electrolytic solution; said inorganic solvent being electrochemically reduced upon the surface of said cathode current collector, whereby said iorganic solvent in conjunction with said oxidizable anode material serves as a source of electrical energy during operation of said cell.

* * * * *

PO-1050
(5/69)

UNITED STATES PATENT OFFICE
CERTIFICATE OF CORRECTION

Patent No. 3,926,669          Dated December 16, 1975

Inventor(s) James J. Auborn

It is certified that error appears in the above-identified patent and that said Letters Patent are hereby corrected as shown below:

Column 1, after the title, insert the following:

--The invention herein described was made in the course of or under a contract or subcontract with the U. S. government.--

Column 5, line 54, change "of" (first instance) to --on--.

Column 8, line 44, change "electrposi-" to --electroposi--.

Column 8, lines 55 and 56, delete "monobromophosphoryl dichloride, phosphorus oxybromide,".

Signed and Sealed this twenty-seventh Day of April 1976

[SEAL]

Attest:

RUTH C. MASON
Attesting Officer

C. MARSHALL DANN
Commissioner of Patents and Trademarks

Notice of Adverse Decision in Interference

In Interference No. 99,876, involving Patent No. 3,926,669, J. J. Auborn, ELECTROCHEMICAL CELLS HAVING AN ELECTROLYTIC SOLUTION COMPRISING A COVALENT INORGANIC OXYHALIDE SOLVENT, final judgment adverse to the patentee was rendered June 18, 1981, as to claims 1–11, and 13–15.

[*Official Gazette October 19, 1982.*]